United States Patent
Li et al.

(10) Patent No.: US 12,437,365 B2
(45) Date of Patent: *Oct. 7, 2025

(54) ADAPTIVE REAL TIME DISCRETE COSINE TRANSFORM IMAGE AND VIDEO PROCESSING WITH CONVOLUTIONAL NEURAL NETWORK ARCHITECTURE

(71) Applicant: AtomBeam Technologies Inc., Moraga, CA (US)

(72) Inventors: Zhu Li, Overland Park, KS (US); Paras Maharjan, Kansas City, MO (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,463

(22) Filed: Nov. 27, 2024

(65) Prior Publication Data

US 2025/0285225 A1     Sep. 11, 2025

Related U.S. Application Data

(63) Continuation-in-part of application No. 18/596,677, filed on Mar. 6, 2024, now Pat. No. 12,198,304.

(51) Int. Cl.
*G06T 5/10*     (2006.01)
*G06T 5/50*     (2006.01)
(Continued)

(52) U.S. Cl.
CPC .................. *G06T 5/10* (2013.01); *G06T 5/50* (2013.01); *G06T 5/60* (2024.01); *G06T 5/73* (2024.01);
(Continued)

(58) Field of Classification Search
CPC .... G06T 5/60; G06T 5/10; G06T 5/73; G06T 2207/20021; G06T 2207/20052;
(Continued)

(56) References Cited

U.S. PATENT DOCUMENTS

| | | | |
|---|---|---|---|
| 11,669,939 B1 * | 6/2023 | Ferrés | G06T 5/60 |
| | | | 382/167 |
| 12,198,304 B1 * | 1/2025 | Li | G06T 5/10 |
| 2023/0360383 A1 * | 11/2023 | Lee | G06V 10/72 |

OTHER PUBLICATIONS

Maharjan, Paras et al., "DCTResNet: Transform Domain Image Deblokcing for Motion Blur Images, International Conference on Visual Communications and Image Processing," 2021, pp. 1-5, United States.

* cited by examiner

*Primary Examiner* — Bobbak Safaipour
(74) *Attorney, Agent, or Firm* — Galvin Patent Law LLC; Brian R Galvin

(57) ABSTRACT

A system and method for real time discrete cosine transform image and video processing with convolutional neural network architecture. The system and method transforms degraded inputs into subband images, which are analyzed by a machine learning classification network to identify specific types of blur and compression artifacts. The classification network dynamically adjusts the parameters of separate DC and AC deblurring networks based on its analysis. This adaptive approach optimizes processing for various degradation types, improving the quality of the reconstructed output. The system and method's real-time capability and enhanced adaptability make it suitable for a wide range of imaging and video applications, offering superior performance over traditional methods.

18 Claims, 14 Drawing Sheets

(51) Int. Cl.
*G06T 5/60* (2024.01)
*G06T 5/73* (2024.01)

(52) U.S. Cl.
CPC ............... *G06T 2207/20004* (2013.01); *G06T 2207/20052* (2013.01); *G06T 2207/20064* (2013.01); *G06T 2207/20081* (2013.01); *G06T 2207/20084* (2013.01)

(58) Field of Classification Search
CPC . G06T 2207/20064; G06T 2207/20081; G06T 2207/20084
See application file for complete search history.

ADAPTIVE REAL TIME DISCRETE COSINE TRANSFORM IMAGE AND VIDEO PROCESSING WITH CONVOLUTIONAL NEURAL NETWORK ARCHITECTURE

CROSS-REFERENCE TO RELATED APPLICATIONS

Priority is claimed in the application data sheet to the following patents or patent applications, each of which is expressly incorporated herein by reference in its entirety:
  Ser. No. 18/596,677

BACKGROUND OF THE INVENTION

Field of the Art

The present invention is in the field of image processing, and more particularly image deblurring.

Discussion of the State of the Art

Image deblurring is a classical low-level vision task of enhancing and improving the quality of an image by removing blurring artifacts that are caused by factors such as camera motion, object motion, missed focus, insufficient depth of field, or lens softness. Blur in an image is unavoidable, but can be minimized using good quality sensors and post processing methods. In smartphone cameras, image blur is common and noticeable because of the compact form factor lens and imagine sensor used in smartphones. Image deblurring is an essential step in improving image and video systems which in turn increases the quality of image reproduction, ultimately leading to better visual perception.

Modem processing techniques can be divided into two major categories: spatial domain processing and transform domain processing. Out of the two major categories, spatial domain processing is more commonly used and generally pertains to processing in either RGB color space or in the raw sensor space. The process involves manipulating or enhancing an image by working directly with an image's pixel values. Even earlier methods such as inverse filtering and Wiener filtering try to deblur images by converting into a frequency domain, provided the degradation of the image is from a known global blur kernel. Very few methods employ transform domain processing that usually decomposes an image into subband images and then performs processing in the transform domain.

Most conventional methods rely on the energy optimization approach to jointly estimate the blur kernel and latent sharp image from a single blurry image. The energy optimization approach refers to techniques that minimize an energy function associated with an image. The approach may be applied to a variety of image processing methods, including image deblurring. These methods assume that a scene is static and that any blur is caused by camera motion only. Some recent methods for dynamic scenes assume that blur in an image is caused by both camera motion and object motion. Blind motion deblurring further assumes that blur in an image is non-uniformly distributed and performs image deblurring by segmenting the image into regions with different blurs and uses a box filter to restore a sharp image.

Recent advancements in deep learning and the availability of realistic, real world datasets has spurred the development of using convolutional neural networks (CNNs) for image deblurring. Multiscale CNNs use coarse to fine architecture to gradually restore a sharp image on different resolutions in a pyramid. Generally, CNNs are used in tandem with spatial domain processing to produce a restored image.

The issue with currently used image deblurring methods is that they are highly sensitive to noise and fail to restore images when subjective to real world scenarios. Additionally, image and video processing needs to be done after footage or an image is taken in post-production processing. This increases the amount of time and effort it takes to produce high quality videos and images.

What is needed is a system and method for real time video and image processing which utilizes both frequency domain and convolutional neural network techniques to increase the quality and efficiency of image processing which may occur during or after production.

SUMMARY OF THE INVENTION

Accordingly, the inventor has conceived and reduced to practice, a system and method for adaptive real time discrete cosine transform image and video processing with convolutional neural network architecture. It incorporates discrete cosine transform image processing with convolutional neural networks to achieve fast and efficient image processing that yields more reliable results than previous methods. Traditional convolutional neural networks have been applied to spatial domain processing, however, applying convolutional neural networks to transform domain processing demonstrates far better results than ever achieved with spatial domain processing. The proposed system and method enable effective, real time, image processing which is applicable to a wide range of image and video inputs. Additionally, the proposed system and method allow for low-latency image processing because the entire method and system is linear. There is no need to loop through the system and method more than once which frees up computational power and time.

Studies show that the proposed system and method produce far more accurate results than currently utilized image processing methods. When compared against other image processing methods, the proposed system and method maintains the highest Peak Signal-to-Noise Ratio (PSNR) using both ensembled and non-ensembled methods. Ensemble learning is where a neural network uses a plurality of neural network models to achieve a goal. The proposed system and method outperform other network's PSNR when it uses a singular neural network and when it uses ensembled neural networks.

According to a preferred embodiment, a system for adaptive real time discrete cosine transform image and video processing with convolutional neural network architecture, comprising: a computing device comprising at least a memory and a processor; a Discrete Cosine Transform (DCT) Block configured to receive an initial input and output a plurality subband images; a plurality of DCT Deblur Network channels comprising a DCT Deblur Network DC channel and a DCT Deblur Network AC channels, wherein each channel is configured to process a specific_frequency component; a parallel processing unit configured to simultaneously process all DCT Deblur Network channels; and a plurality of programming instructions stored in the memory and operable on the processor, wherein the first plurality of programming instructions, when operating on the processor, cause the computing device to: send a degraded input through the DCT Block where the degraded image is transformed into a plurality of transformed images; and simultaneously process the plurality of transformed images with all DCT Deblur Network channels using the parallel processing unit, is disclosed.

According to another preferred embodiment, a method for real time discrete cosine transform image and video processing with convolutional neural network architecture, comprising the steps of: sending a degraded input through a DCT Block where the degraded image is transformed into a plurality of transformed images; and simultaneously processing the plurality of transformed images using a plurality of DCT Deblur Network channels using the parallel processing unit, is disclosed.

According to an aspect of an embodiment, the DCT Deblur Network system further comprises a convolutional neural network.

According to an aspect of an embodiment, the DCT Block transforms the degraded image by using a 4×4 Discrete Cosine Transform function.

According to an aspect of an embodiment, the DCT block transforms the degraded image by using a wavelet transform function.

According to an aspect of an embodiment, the 4×4 Discrete Cosine Transform function creates a plurality of subband images which may either be high energy (AC) or low energy (DC).

According to an aspect of an embodiment, a loss function may be used to compute the transform domain loss for each channel in the DCT Deblur Network system.

According to an aspect of an embodiment, an adaptive blur and artifact classification module that processes the plurality of subband images into a plurality of identified degradations.

According to an aspect of an embodiment, the adaptive blur and artifact classification module adjusts the DCT Deblur Network channels to be optimized for the plurality of identified degradations.

According to an aspect of an embodiment, the adaptive blur and artifact classification module is trained using a database of identified degradations, including but not limited to blurs and artifacts.

BRIEF DESCRIPTION OF THE DRAWING FIGURES

DETAILED DESCRIPTION OF THE INVENTION

Figure 1:
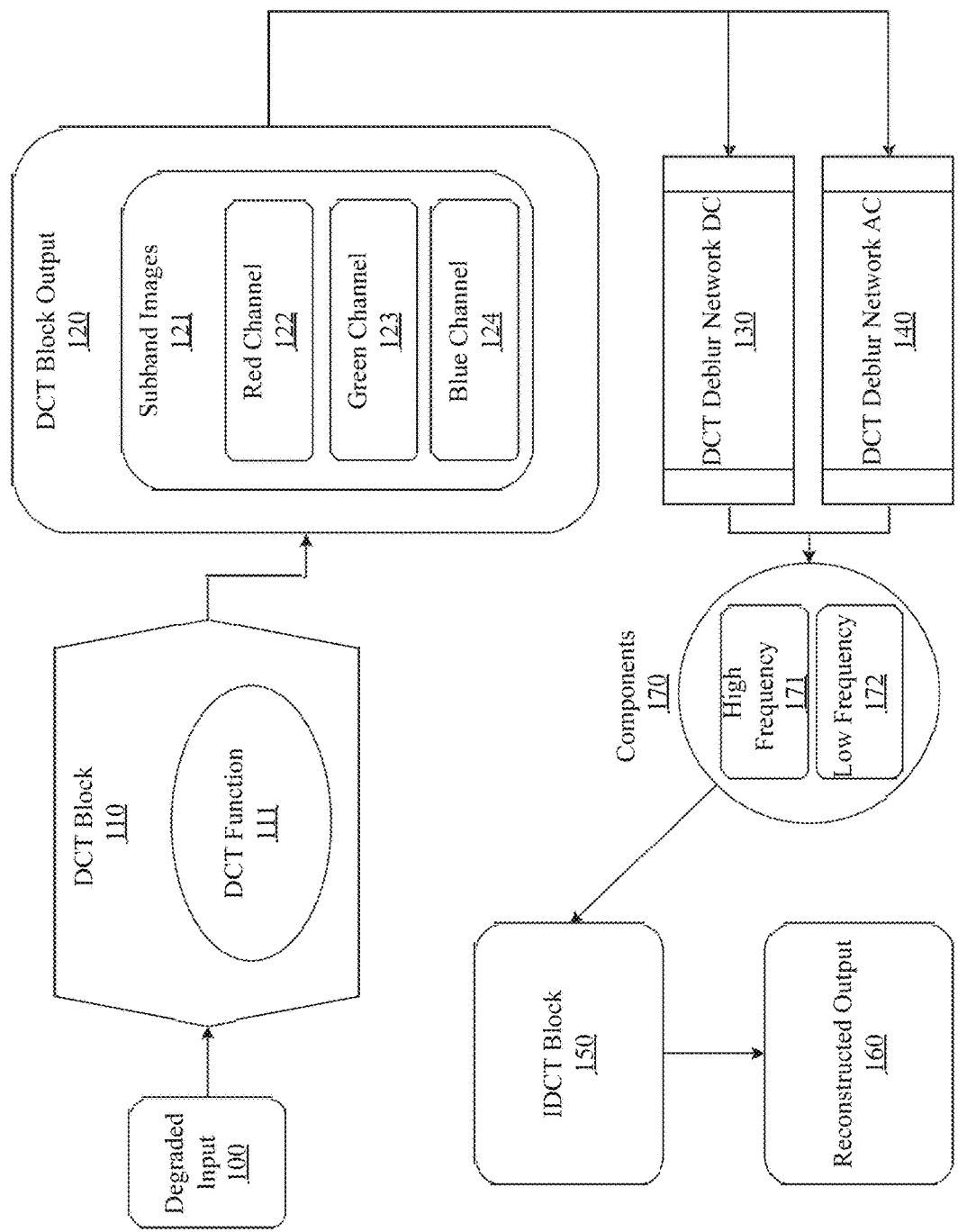
FIG. 1 is a block diagram illustrating an exemplary system architecture for real time discrete cosine transform image and video processing with convolutional neural network architecture, according to an embodiment.

The inventor has conceived, and reduced to practice, a system and method for adaptive real time discrete cosine transform image and video processing with convolutional neural network architecture.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for real time discrete cosine transform image and video processing with convolutional neural network architecture, according to an embodiment. The system comprises a degraded input 100, a DCT block 110, a DCT block output 120, a DCT Deblur Network DC channel 130, a DCT Deblur Network AC channel 140, an IDCT block 150, and a reconstructed output 160.

In one embodiment, the degraded input 100 is passed through and transformed into a plurality of subband images by the DCT block 110 which may use a blockwise 4×4 Discrete Cosine Transform (DCT) function 111. A Discrete Cosine Transform function is not the only function that may be used in this process. For example, in one embodiment, the DCT block may use a wavelet transform function instead of a DCT function. The DCT output 120 in one embodiment may be a fraction of the degraded input's 100 resolution with a plurality of subband images 121 for a red 122, a green 123, and a blue 124 channel. The DCT output 120 may be passed through two transform domain deblurring networks, the DCT Deblur Network AC 140 and the DCT Deblur Network DC 130 channels collectively referred to as the channels. In one embodiment, the channels use a parallel configuration to deblur the plurality of subband images separately for a plurality of high frequency components 171 and a plurality of low frequency components 172—collectively referred to as the components 170. The plurality of high frequency components 171 and the plurality of low frequency components 172 may be passed through an IDCT block 150 which may reconstruct the components using Inverse Discrete Cosine Transform. The IDCT block 150 uses the inverse of the function used in the DCT block 110. In one embodiment, the IDCT block 150 may use an inverse wavelet transform function. The components are reconstructed into a reconstructed output 160.

High frequency components 171 and low frequency components 172 are labeled high and low frequency because of the information they contain. The plurality of subband images may be comprised of a plurality of static images which represent the stationary portions of the degraded input 100 and a plurality of dynamic images which represent the dynamic, blurred portions of the degraded input 100. Static portions of the degraded image 100 are referred to as DC components. Dynamic portions of the degraded image 100 are referred to as AC components.

Figure 2:
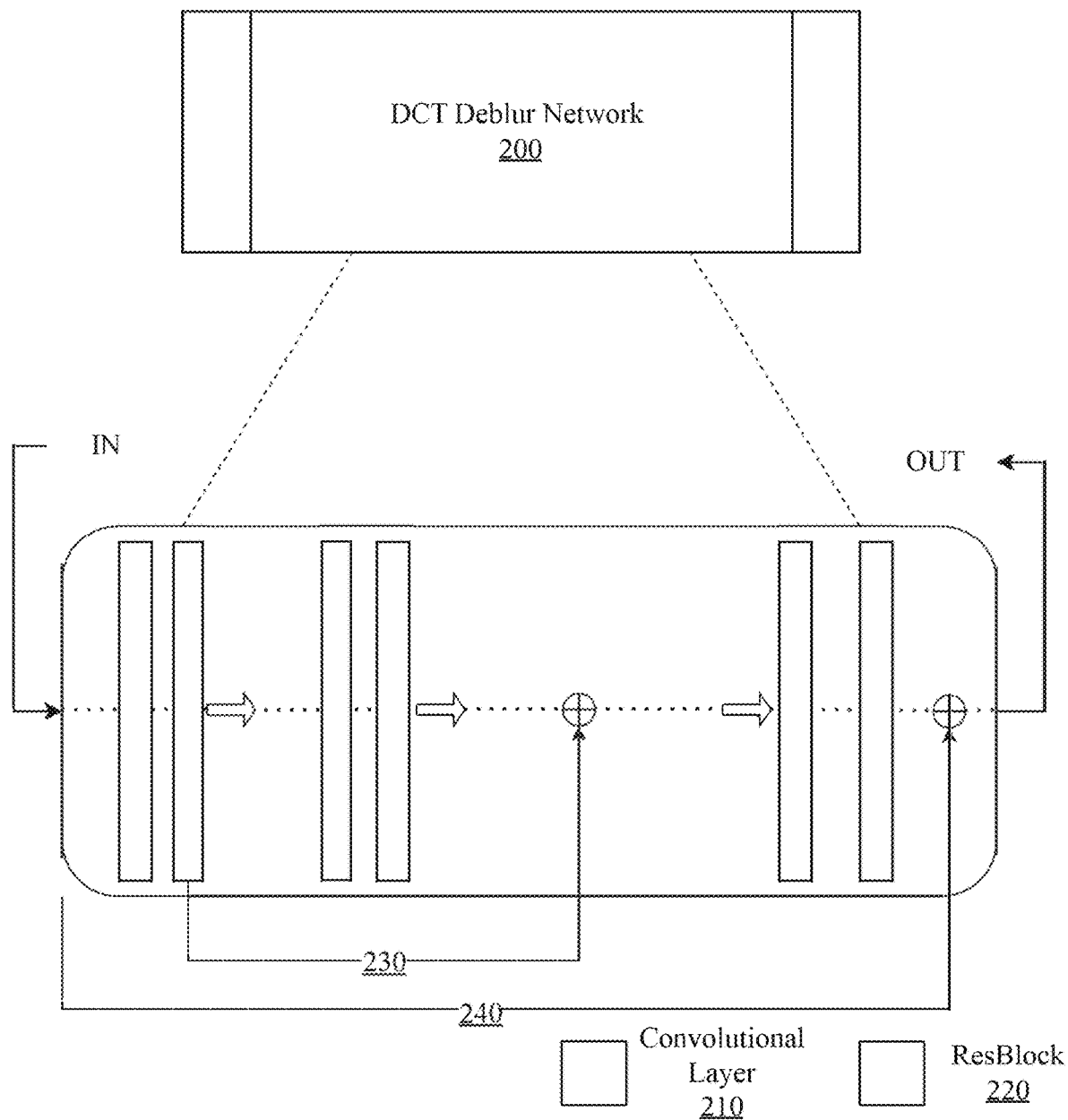
FIG. 2 is a block diagram illustrating an exemplary architecture for a subsystem of the system for real time discrete cosine transform image and video processing with convolutional neural network architecture, a DCT Deblur Network system.

FIG. 2 is a block diagram illustrating an exemplary architecture for a subsystem of the system for real time discrete cosine transform image and video processing with convolutional neural network architecture, a DCT Deblut Network system comprising a DCT Deblur Network DC 130 channel and a DCT Deblur Network AC 140 channel. A DCT Deblur Network channel 200 may be comprised of a plurality of convolutional neural network functions including convolutional layers 210, a plurality of ResBlocks 220, and a plurality of connections which may include a sub-band specific pixel residue connection 240 and a feature-level skip connection 230. In one embodiment, high frequency components 171 and low frequency components 172 are passed through a respective DCT Deblur Network channel 200 by being input through an initial convolutional layer 210. After being input through the initial convolutional layer, the channels may be transformed by a series of convolutional layers 210 and ResBlocks 220 where the series comprises a sub-band specific pixel residue connection 240 and a feature-level skip connection 230. For the purposes of FIG. 4, convolutional layers 210 are shown by a solid white rectangle, as seen in the legend in the bottom of the figure. Likewise, ResBlocks 220 are shown by a rectangle filled with diagonal lines, as seen in the legend in the bottom of the figure.

Figure 3:
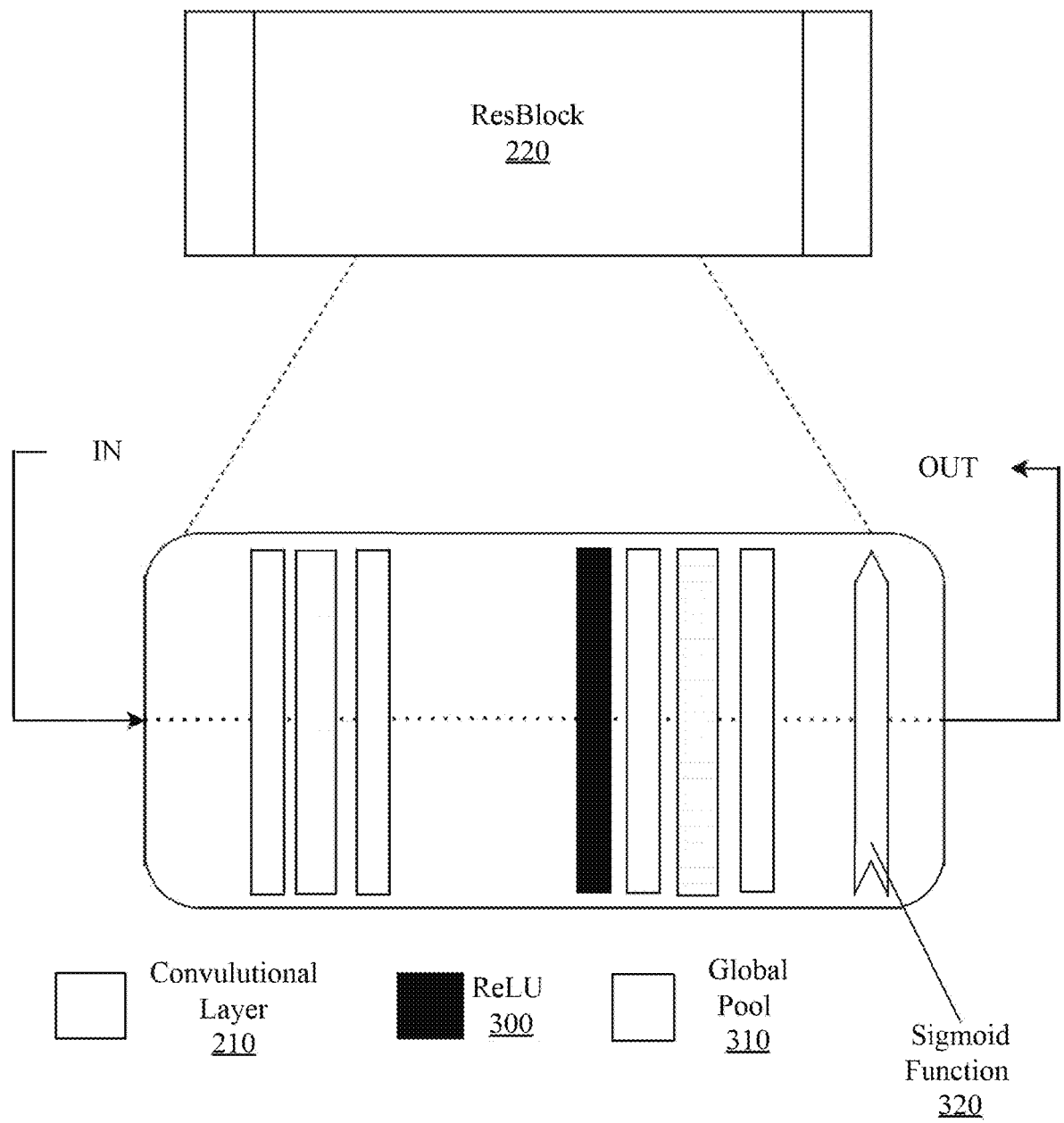
FIG. 3 is a block diagram illustrating an exemplary architecture for a component of the DCT Deblur Network subsystem, a ResBlock.

FIG. 3 is a block diagram illustrating an exemplary architecture for a component of the DCT Deblur Network subsystem, a ResBlock. A ResBlock may be further comprised of a plurality of convolutional layers 210, a plurality of Rectified Linear Units (ReLUs) 300, a plurality of Global Pooling layers 310, and a plurality of Sigmoid Functions 320. In one embodiment, a ResBlock 220 may be comprised of components in the following order: a convolutional layer 210, a ReLU layer 300, a convolutional layer 210, a ReLU layer 300, a convolutional layer 210, a global pooling layer 310, a convolutional layer 210, and a sigmoid function 320 where each layer may contain a plurality of its corresponding components. In FIG. 3, convolutional layers 210 are denoted by solid white rectangles, ReLU layers 300 are denoted by solid black rectangles, and global pooling layers 310 are denoted by grid line filled rectangles. In a typical embodiment, each of the proceeding components work in series to complete a ResBlock 220. The ResBlock 220 works in series with additional convolutional layers 210 in a DCT Deblur Network channel to process subband images 121.

Figure 4:
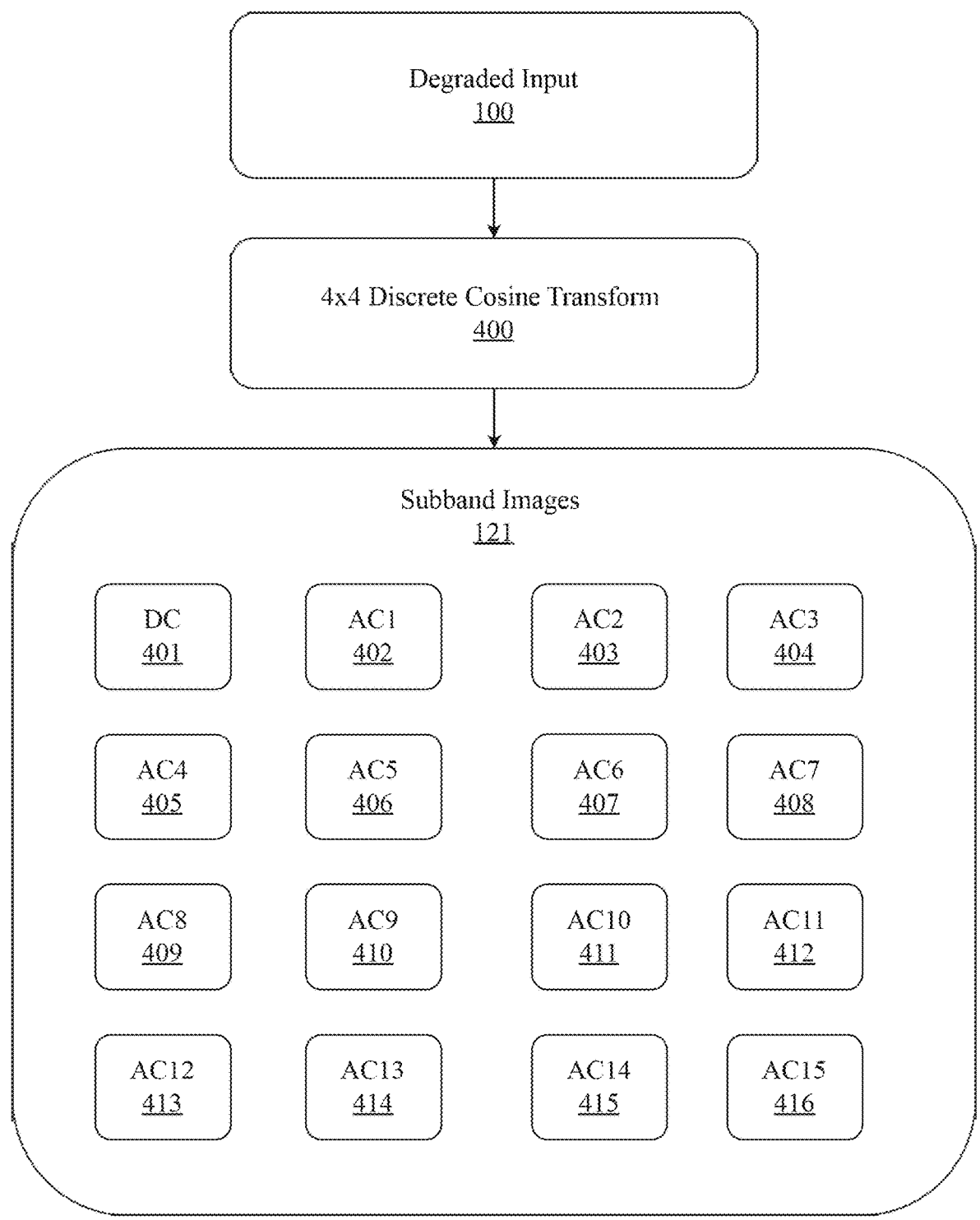
FIG. 4 is a diagram showing an embodiment of one aspect of the real time discrete cosine transform image and video processing with convolutional neural network architecture system, specifically, the DCT Block Output, more specifically, subband images.

FIG. 4 is a diagram showing an embodiment of one aspect of the real time discrete cosine transform image and video processing with convolutional neural network architecture system, specifically, the DCT Block Output 120, more specifically, the subband images. In one embodiment, a 4×4 Discrete Cosine Transform 400 is applied to the degraded input 100 which converts the degraded input 100 into 16 subband images for the red 122, the green 123, and the blue 124 channels. Each color channel may have a plurality of subband images 121 where a plurality of the subband images 121 will be low frequency (DC) images and a plurality of the subband images 121 will be high frequency (AC) images. In one embodiment, there may be one DC image and fifteen AC images. In the embodiment where there is one DC image and fifteen AC images, the DC image 401 contains the most information about the degraded input 100. AC1 402 represents the primary vertical component of the degraded input 100, AC4 405 represents the primary horizontal components of the degraded input 100, and AC5 406 represents the primary diagonal component of the degraded input 100. AC1 402, AC4 405, and AC5 406 contain the second highest level of information behind DC 401. They collectively represent vertical, horizontal, and diagonal motion that causes blurring in the degraded input 100. The remaining AC subband images contain progressively less information in either the vertical, horizontal, or diagonal spaces of the degraded input 100. Breaking an imaging into small subband images 121 where each subband image 121 ranges from high levels of information to low levels of information allows for easier processing of each subband image. Additionally, because the principal components containing high levels of information about the degraded input 100 are known, more priority can be given to those subband images (DC 401, AC1 402, AC4 405, AC5 406) during image processing.

Detailed Description of Exemplary Aspects

Figure 5:
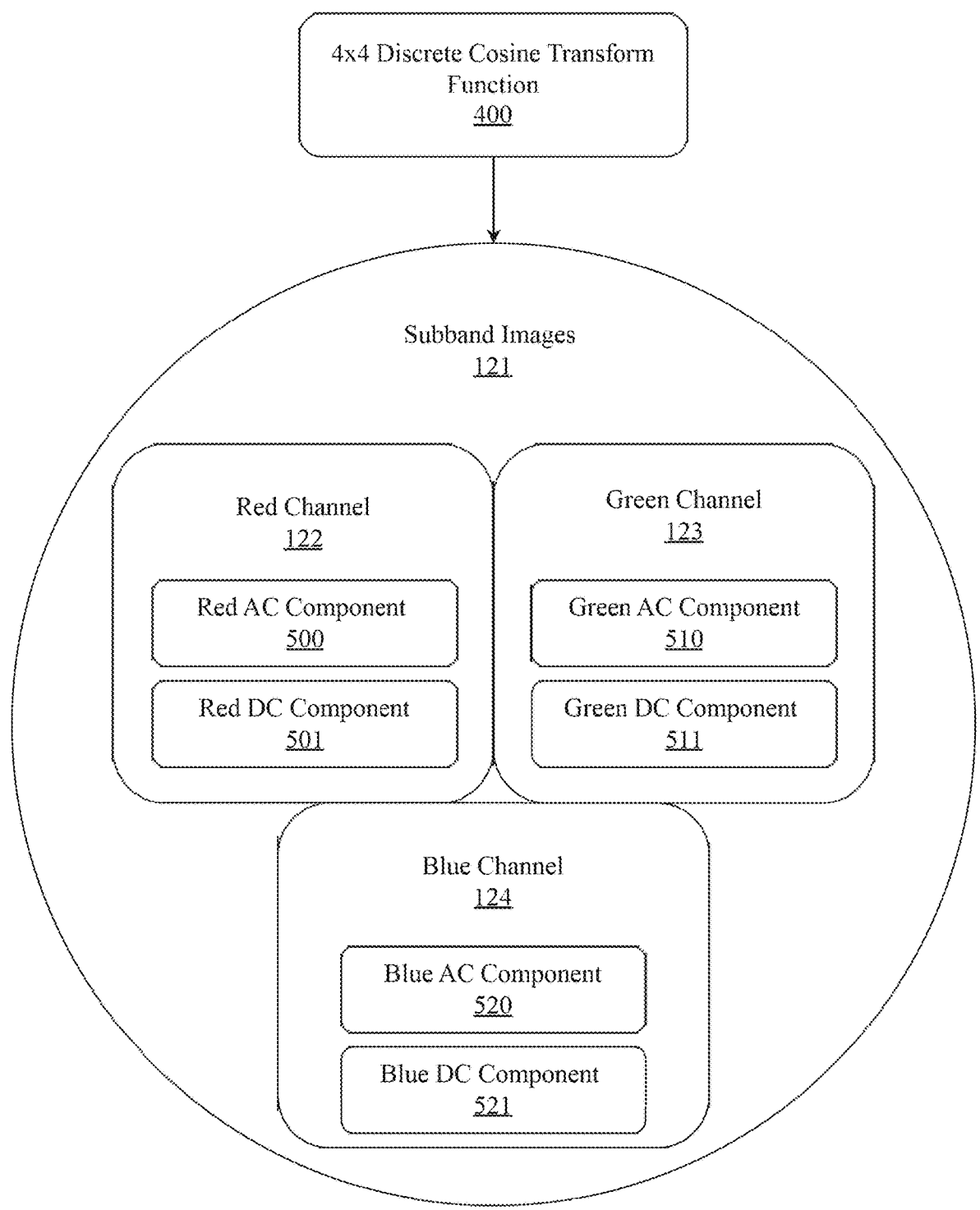
FIG. 5 is a diagram showing an embodiment where the subband images are comprised of three-color components each further comprising an AC component and a DC component.

FIG. 5 is a diagram showing an embodiment where the subband images are comprised of three color components each further comprising an AC component and a DC component. The 4×4 Discrete Cosine Transform function 400 converts the degraded input into three sets of corresponding subband images 121. In one embodiment, there may be three sets of subband images, one for a red channel 122, one for a green channel 123, and one for a blue channel 124. Because a 4×4 Discrete Cosine Transform function 400 was used, the subband images 121 will have sixteen components comprising a plurality of AC and DC components. Each red, green, and blue channel will have corresponding AC and DC component. In one embodiment, the red channel 122 may have one red DC component 501 and fifteen red AC components 500. The green channel 123 may have one green DC component 510 and fifteen green AC components 511. Additionally, the blue channel 124 may have one blue DC component 520 and fifteen blue AC components 521. Each AC and DC component would subsequently be passed into the DCT Deblur Network channels.

Figure 6:
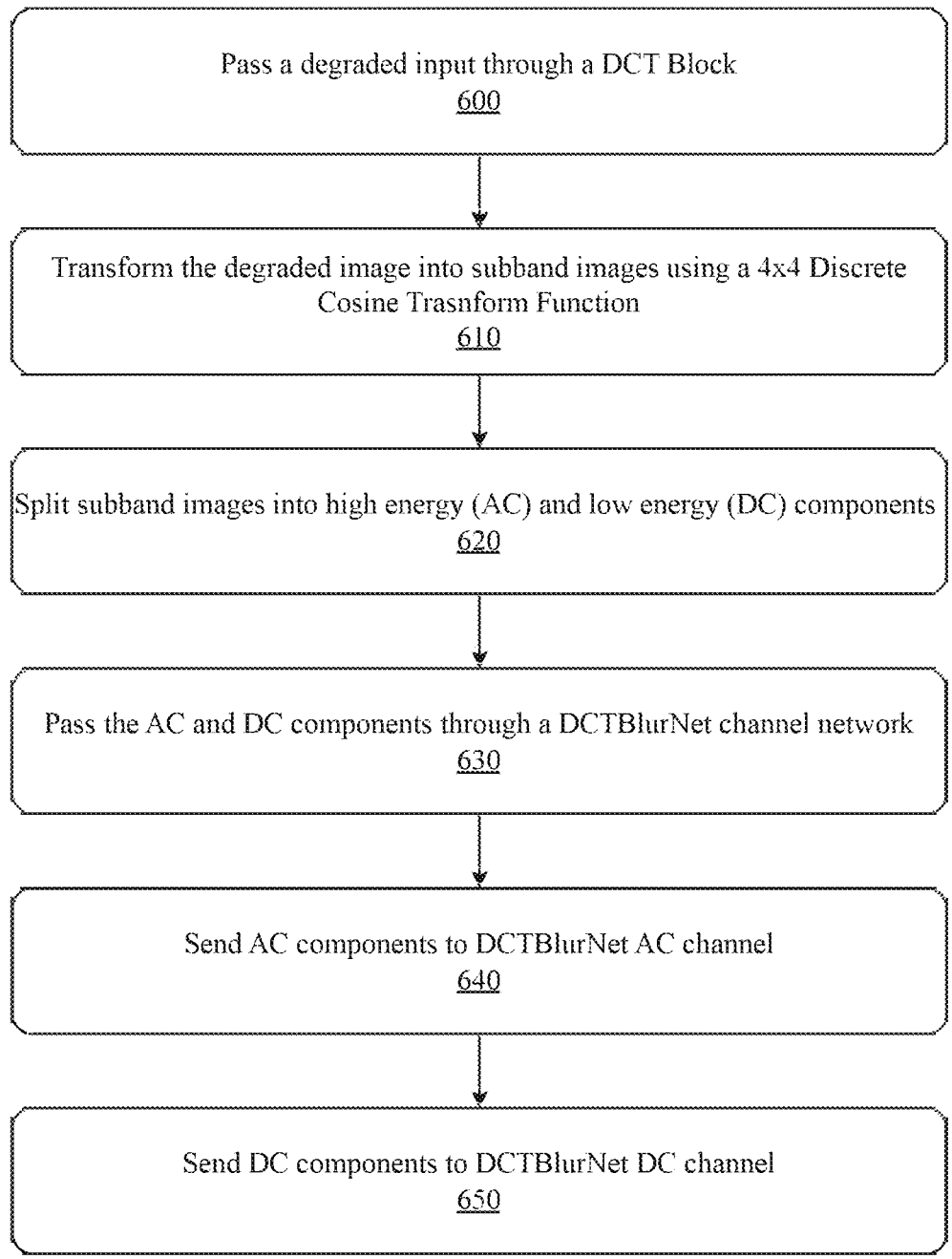
FIG. 6 is a flow diagram illustrating an exemplary method for image and video deconstruction, according to an embodiment.

FIG. 6 is a flow diagram illustrating an exemplary method for image and video deconstruction, according to an embodiment. Regarding the steps in this diagram, there is no strict requirement for the steps to be in this particular order. In a first step 600, a degraded input is passed through a DCT block. In a step 610 the degraded image is transformed into subband images using a 4×4 Discrete Cosine Transform Function. In a step 620, the subband images are split into high energy (AC) and low energy (DC) components. In a step 630, the AC and DC components are passed through a DCT Deblur Network channel. In a step 640, the AC components are sent to a DCT Deblur Network AC channel. In a step 650, the DC components are sent to a DCT Deblur Network DC channel.

Figure 7:
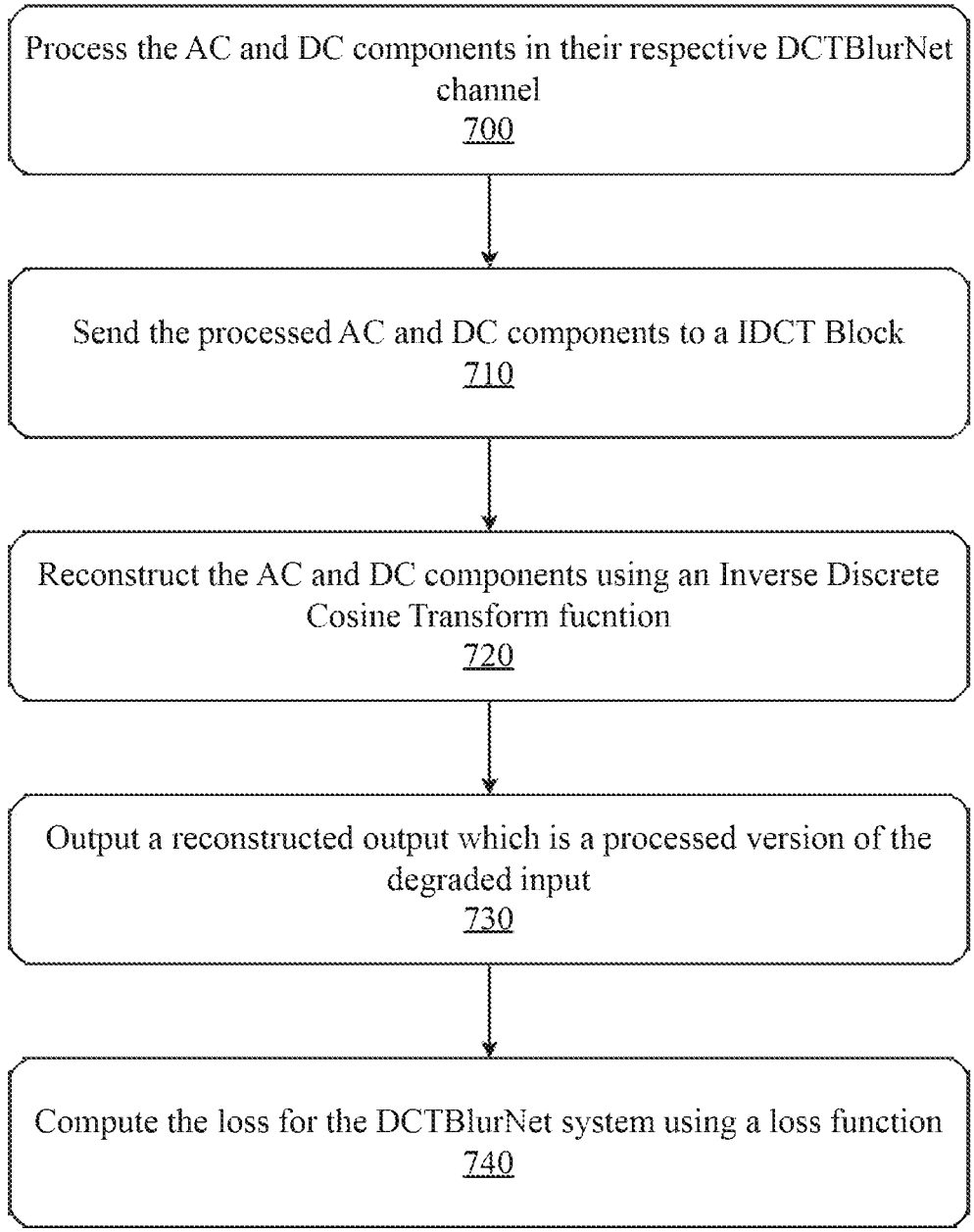
FIG. 7 is a flow diagram illustrating an exemplary method for image and video reconstruction, according to an embodiment.

FIG. 7 is a flow diagram illustrating an exemplary method for image and video reconstruction, according to an embodiment. Regarding the steps in this diagram, there is no strict requirement for the steps to be in this particular order. In a first step 700, the AC and DC components are processed in their respective DCT Deblur Network channel. In a step 710 the processed AC and DC components are sent to an IDCT Block. In a step 720, the AC and DC components are reconstructed using an Inverse Discrete Cosine Transform function. In a step 730, the reconstructed output which is a processed version of the degraded input is output by the IDCT Block. In a step 740, a loss function computes the loss for the DCT Deblur Network channels. In one embodiment, an example of a loss function may be the following:

$$L_1 = \sum_{i=1}^{N} \left\| I_{DCT}(i) - \hat{I}_{DCT}(i) \right\|$$

Where $\hat{I}_{DCT}$ is predicted DCT subband image, $I_{DCT}$ is corresponding ground-truth DCT subband image, and N is the number of pixels. Since AC and DC networks may be trained separately, two loss functions may be used for AC and DC channels, where the DC network is only learning the DC subband images and the AC network is learning all the AC subband images.

Figure 8:
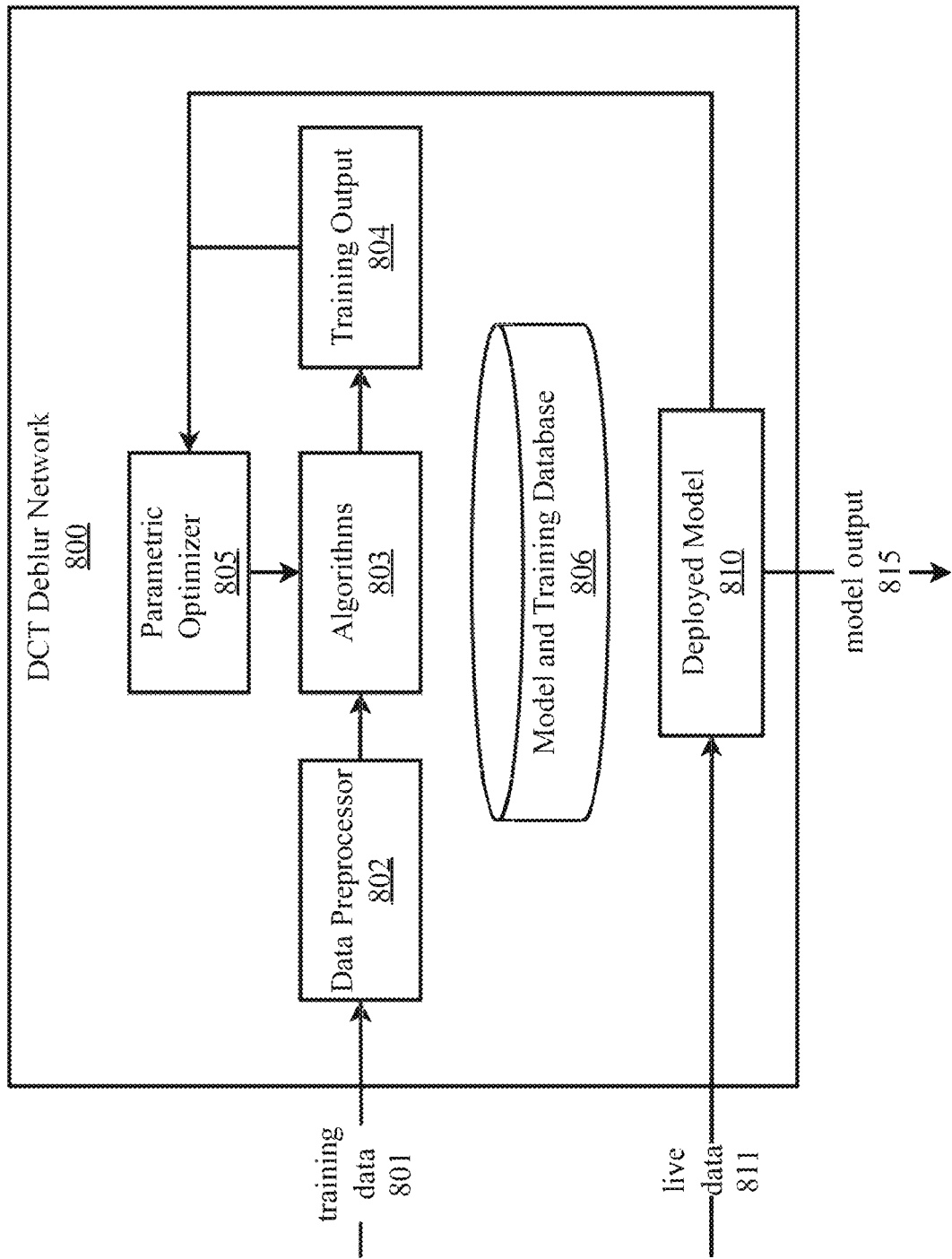
FIG. 8 is a block diagram illustrating an exemplary aspect of a system for image processing using a convolutional neural network, the DCT Deblur Network system.

FIG. 8 is a block diagram illustrating an exemplary aspect of a system for image processing using a convolutional neural network, the DCT Deblur Network system 800. According to the embodiment, DCT Deblur Network system 800 may comprise a model training stage comprising a data preprocessor 802, one or more machine and/or deep learning algorithms 803, training output 804, and a parametric optimizer 805, and a model deployment stage comprising a deployed and fully trained model 810 configured to perform tasks described herein such as transcription, summarization, agent coaching, and agent guidance. DCT Deblur Network system 800 may be used to train and deploy DCT Deblur Network DC 130 and DCT Deblur Network AC 140 in order to support quality of the reconstructed output 160.

At the model training stage, a plurality of training data 801 may be received by the DCT Deblur Network 800. In some embodiments, the plurality of training data may be obtained from one or more database(s) 806 and/or directly from the DCT block 110. Data preprocessor 802 may receive the input data and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 802 may also be configured to create training dataset, a validation dataset, and a test set from the plurality of input data 801. For example, a training dataset may comprise 80% of the preprocessed input data, the validation set 10%, and the test dataset may comprise the remaining 10% of the data. The preprocessed training dataset may be fed as input into one or more machine and/or deep learning algorithms 803 to train a predictive model for object monitoring and detection.

DCT Deblur Network 800 may be fine-tuned using a loss function which compares the predicted subband image against a ground-truth subband image. Fine-tuning involves adjusting the model's parameters to make it perform better on specific tasks or data. In this case, the goal is to improve the model's performance processing images and videos. The fine-tuned models are expected to provide improved accuracy when processing images and videos, which can be crucial for applications like deblurring images. The refined models can be optimized for real-time processing, meaning they can quickly analyze and process an image or video as soon as they are input into the system.

During model training, training output 404 is produced and used to measure the accuracy and usefulness of the predictive outputs. During this process a parametric optimizer 805 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

A model and training database 806 is present and configured to store training/test datasets and developed models. Database 806 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 803 may comprise a deep learning algorithm such as neural networks (e.g., recurrent, convolutional, long short-term memory networks, etc.).

In some implementations, the DCT Deblur Network 800 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database 810.

Figure 9:
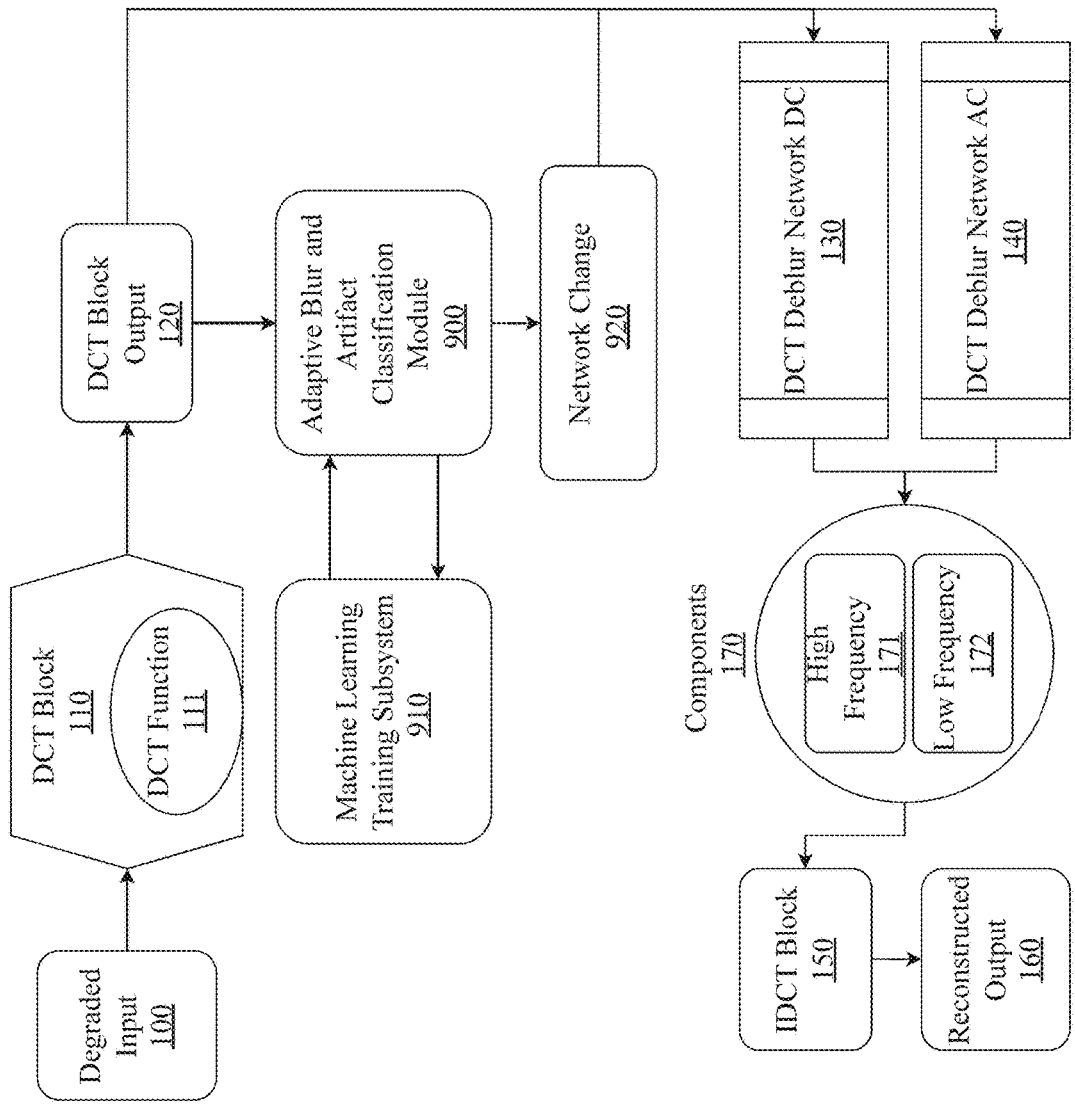
FIG. 9 is a block diagram illustrating an exemplary system architecture for adaptive real time discrete cosine transform image and video processing with convolutional neural network architecture, according to an embodiment.

FIG. 9 is a block diagram illustrating an exemplary system architecture for adaptive real time discrete cosine transform image and video processing with convolutional neural network architecture, according to an embodiment. In one embodiment, the system may include an adaptive blur and artifact classification module 900. This module is positioned between DCT block output 120 and DCT deblur network channels 130 and 140, allowing the adaptive blur and artifact classification module 900 to analyze the transformed image data before it undergoes deblurring. The adaptive blur and artifact classification module 900 may employ machine learning techniques to identify and categorize various types of blur and compression artifacts present in the input image or video frame.

Upon receiving the DCT block output, adaptive blur and artifact classification module 900 performs a rapid analysis of the subband images. It extracts features that are indicative of different types of degradation, such as motion blur, defocus blur, or compression artifacts like blocking or ringing. These features might include statistical measures of the frequency components, edge characteristics, or texture patterns. The module then uses its trained classification model to determine the predominant types and severity of degradation present in the current frame.

A machine learning training subsystem 910 trains the adaptive blur and artifact classification module 900. This subsystem may train adaptive blur and artifact classification module 900 initially, or over time while the system operates, continuously refining the classification model based on new data and feedback from the system's performance. For example, if the system encounters a new type of artifact that it struggles to classify accurately, the machine learning training subsystem can incorporate this new data into its training set, update the model, and improve future classifications.

A network change component 920 acts as the bridge between the classification results and the DCT deblur networks. Based on the output from adaptive blur and artifact classification module 900, the network change component dynamically adjusts the parameters and processing strategies of both the DC and AC deblur networks 130 and 140. For instance, if the classification module 900 determines that the current frame primarily suffers from motion blur, the network change component might instruct the AC deblur network 140 to focus more heavily on horizontal frequency components, which are typically more affected by motion blur.

These new components work in concert to create a more adaptive and efficient image processing system. As an example of their operation, consider a video stream where the scenes rapidly switch between a fast-moving sports event and a static interview. Adaptive blur and artifact classification module 900 would quickly identify the changing blur characteristics between these scenes. For the sports footage, it might detect motion blur and instruct the network change component to optimize the deblur networks for motion compensation. When the scene changes to the static interview, the module might instead detect compression artifacts, prompting a different set of optimizations focused on reducing blocking and ringing effects.

The integration of these components allows the system to handle a wide variety of image degradations more effectively than a static system could. By continuously adapting its processing strategy to the specific characteristics of each input frame, the system can produce higher quality output across a broader range of real-world scenarios, from high-motion video to compressed still images, all in real-time.

Figure 10:
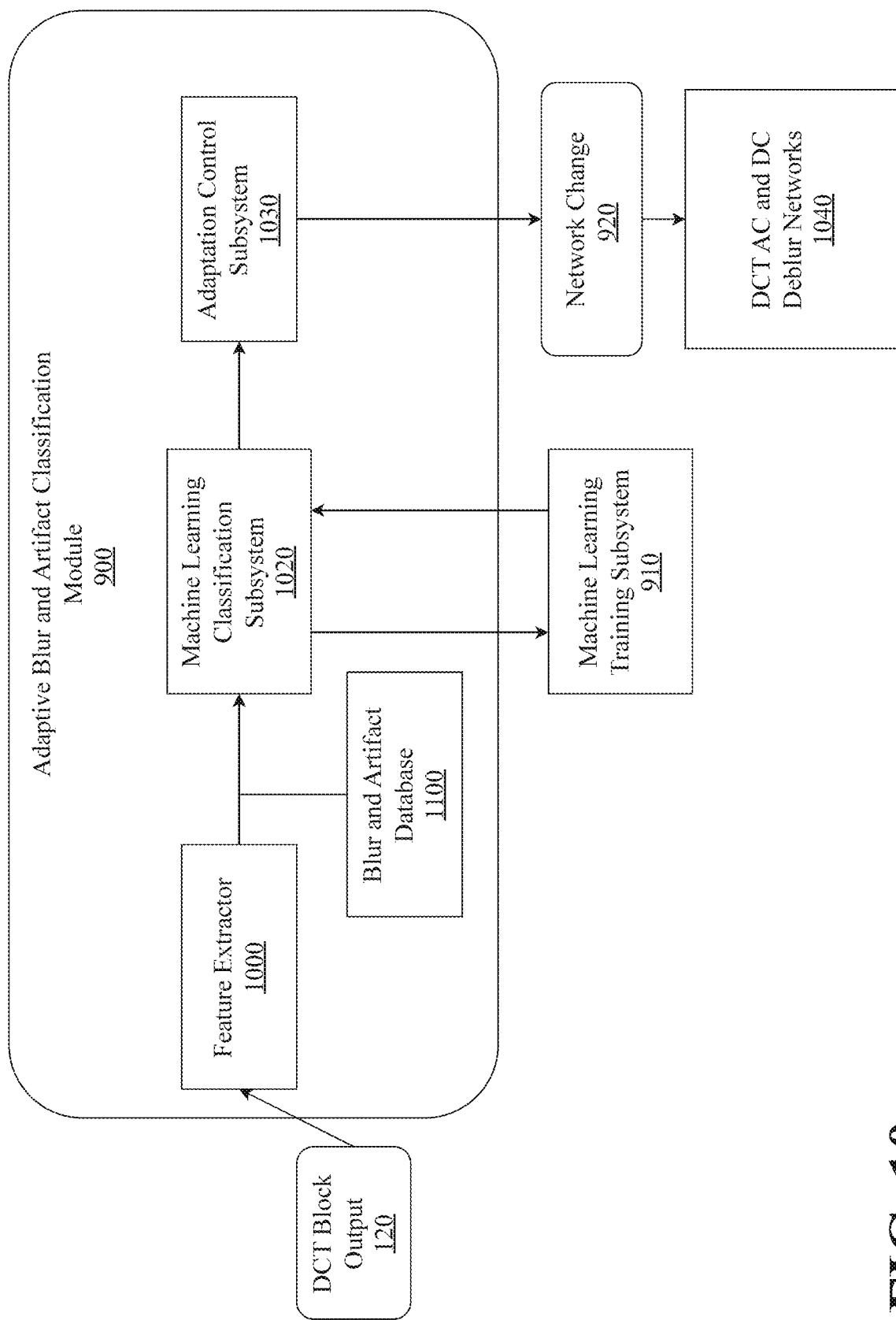
FIG. 10 is a block diagram illustrating an exemplary architecture for a subsystem of the system for adaptive real time discrete cosine transform image and video processing with convolutional neural network architecture, an adaptive blur and artifact classification module.

FIG. 10 is a block diagram illustrating an exemplary architecture for a subsystem of the system for adaptive real time discrete cosine transform image and video processing with convolutional neural network architecture, an adaptive blur and artifact classification module. This module serves as the core of the system's adaptive capabilities, analyzing and categorizing image degradations to optimize the deblurring process. Incoming DCT output blocks 120 are first processed by a feature extractor 1000 within adaptive blur and artifact classification module 900.

This component receives the DCT block output 120 and performs a comprehensive analysis of the transformed image data. Feature extractor 1000 may employ various signal processing techniques to identify key characteristics that indicate different types of blur and artifacts. For example, it might analyze the distribution of frequency components to detect motion blur, examine edge sharpness to identify defocus blur, or look for regular patterns in the DCT coefficients that suggest compression artifacts. The extracted features form a compact yet informative representation of the image degradation, serving as input for the subsequent classification process.

A machine learning classification subsystem 1020 takes the extracted features and determines the types and severity of degradations present in the image. This subsystem utilizes a trained machine learning model, such as but not limited to a neural network or a random forest classifier, to categorize the degradations. The model might output probabilities for different blur types (e.g., 70% motion blur, 30% defocus blur) and artifact types (e.g., 80% blocking artifacts, 20% ringing artifacts), along with severity scores. This detailed classification allows for fine-tuned adaptation of the deblurring process.

An adaptation control subsystem 1030 acts as the decision-making component, translating the classification results into specific instructions for the DCT AC and DC deblur networks 1040. It uses predefined rules and learned patterns to determine the optimal processing parameters for each type and combination of degradations. For instance, if the classification indicates severe motion blur in the horizontal direction, the adaptation control subsystem might instruct the AC deblur network to increase its sensitivity to horizontal frequency components and adjust its filter strengths accordingly.

A blur and artifact database 1100 aids in training machine learning classification subsystem 1020 by storing a comprehensive collection of known degradation patterns, their characteristics, and effective treatment strategies. This database serves multiple purposes: it provides a baseline training corpus for training the machine learning classification subsystem 1020, helps in interpreting new or unusual degradation patterns, and stores successful adaptation strategies for future use. For example, if the system encounters a new combination of blur and compression artifacts, it can compare the extracted features with patterns in the database to make informed decisions about classification and adaptation.

A machine learning training subsystem 910 works in conjunction with the blur and artifact database to continuously improve the system's performance. It periodically retrains the classification model using accumulated data from processed images, user feedback, and new entries in the database. This ongoing learning process allows the system to adapt to new types of degradations and refine its classification accuracy over time. For instance, if users consistently report better results with certain adaptation strategies for specific degradation types, the training subsystem can adjust the classification model and adaptation rules accordingly.

A network change component 920 serves as the final link in this adaptive chain, implementing the instructions from the adaptation control subsystem. It dynamically adjusts the parameters, architectures, or processing flows of the DCT AC and DC deblur networks 1040 based on the adaptation decisions. This might involve switching between different pre-trained network configurations, adjusting layer weights, or modifying the network's attention mechanisms to focus on specific degradation types.

Together, these components form a sophisticated adaptive system capable of handling a wide range of image degradations in real-time. For example, when processing a video stream from a security camera, the system might encounter varying conditions throughout the day. During a clear afternoon, the feature extractor might identify minimal blur and compression artifacts. The classification subsystem would recognize this as a "clean" input, and the adaptation control would instruct the deblur networks to apply minimal processing, preserving the original image details. As night falls and the camera switches to low-light mode, the system might detect increased noise and motion blur. The adaptation control would then adjust the deblur networks to apply stronger noise reduction and motion compensation, optimizing the image quality for these challenging conditions.

This adaptive approach allows the system to maintain high image quality across diverse and changing conditions, making it suitable for a wide range of applications from consumer photography to professional video production and surveillance systems.

Figure 11:
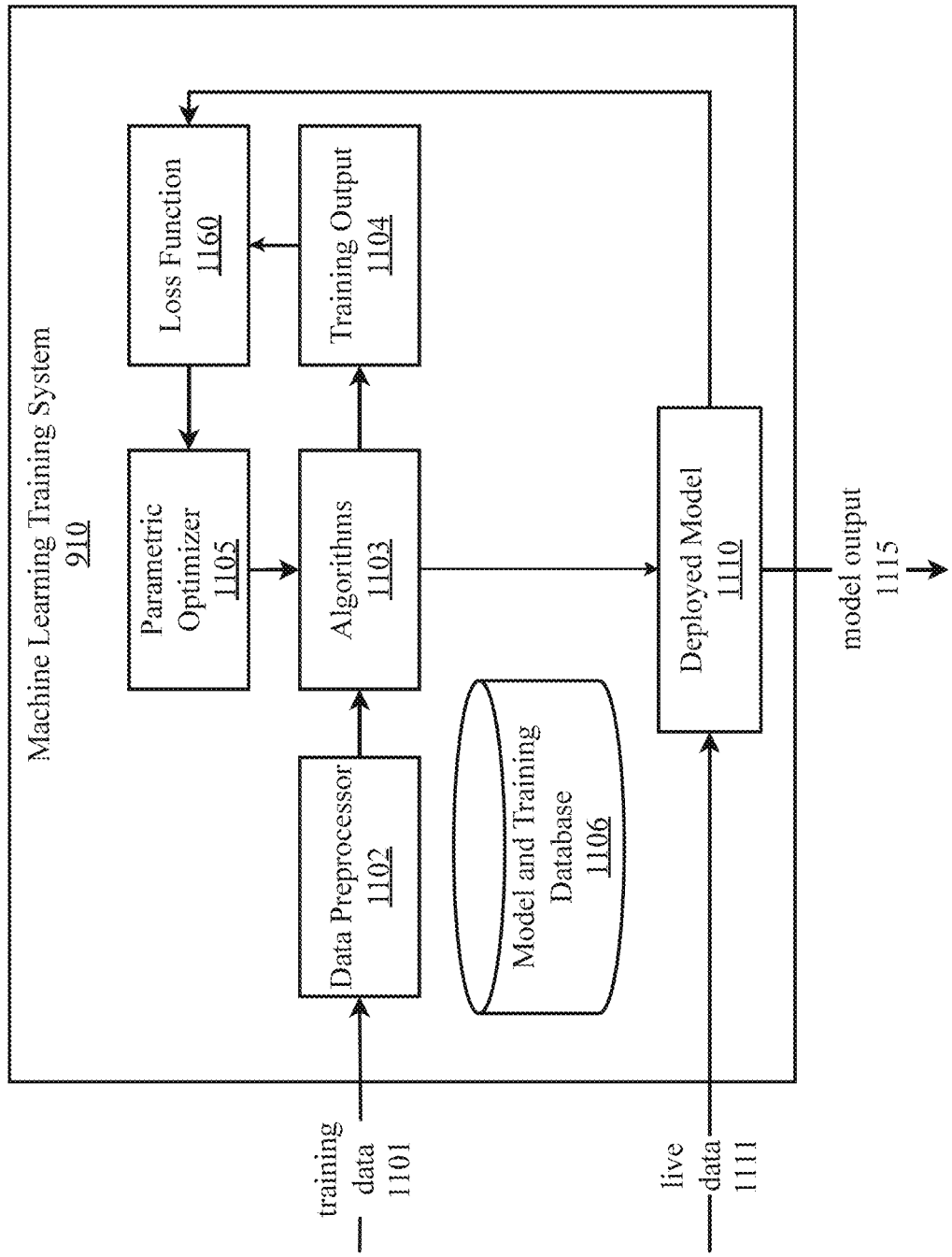
FIG. 11 is a block diagram illustrating an exemplary architecture for a subsystem of the system for adaptive real time discrete cosine transform image and video processing with convolutional neural network architecture, a machine learning training subsystem.

FIG. 11 is a block diagram illustrating an exemplary architecture for a subsystem of the system for adaptive real time discrete cosine transform image and video processing with convolutional neural network architecture, a machine learning training subsystem. According to an embodiment, the machine learning training subsystem 910 may comprise a model training stage comprising a data preprocessor 1102, one or more machine and/or deep learning algorithms 1103, training output 1104, and a parametric optimizer 1105, and a model deployment stage comprising a deployed and fully trained model 1110 configured to perform tasks described herein such as processing codewords through a large codeword model. The machine learning training subsystem 910 may be used to train and deploy an adaptive blur and artifact classification module that can identify what kinds of image or video blemishes are present in an input.

At the model training stage, a plurality of training data 1101 may be received by the machine learning training subsystem 910. Data preprocessor 1102 may receive the input data (e.g., image data, video data, blur data, artifact data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 1102 may also be configured to create training dataset, a validation dataset, and a test set from the plurality of input data 1101. For example, a training dataset may comprise 80% of the preprocessed input data, the validation set 10%, and the test dataset may comprise the remaining 10% of the data. The preprocessed training dataset may be fed as input into one or more machine and/or deep learning algorithms 1103 to train a predictive model for object monitoring and detection.

During model training, training output 1104 is produced and used to measure the accuracy and usefulness of the predictive outputs. During this process a parametric optimizer 1105 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning training subsystem 910 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 1160 to measure the system's performance. The loss function 1160 compares the training outputs with an expected output and determined how the algorithm needs to be changed in order to improve the quality of the model output. During the training stage, all outputs may be passed through the loss function 1160 on a continuous loop until the algorithms 1103 are in a position where they can effectively be incorporated into a deployed model 1115.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 310 in a production environment making predictions based on live input data 1111 (e.g., image data, video data, blur data, artifact data). Further, model correlations and restorations made by deployed model can be used as feedback and applied to model training in the training stage, wherein the model is continuously learning over time using both training data and live data and predictions. A model and training database 1106 is present and configured to store training/test datasets and developed models. Database 1106 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 1103 may comprise a deep learning algorithm such as neural networks (e.g., recurrent, convolutional, long short-term memory networks, etc.).

In some implementations, the machine learning training subsystem 910 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 1106.

Figure 12:
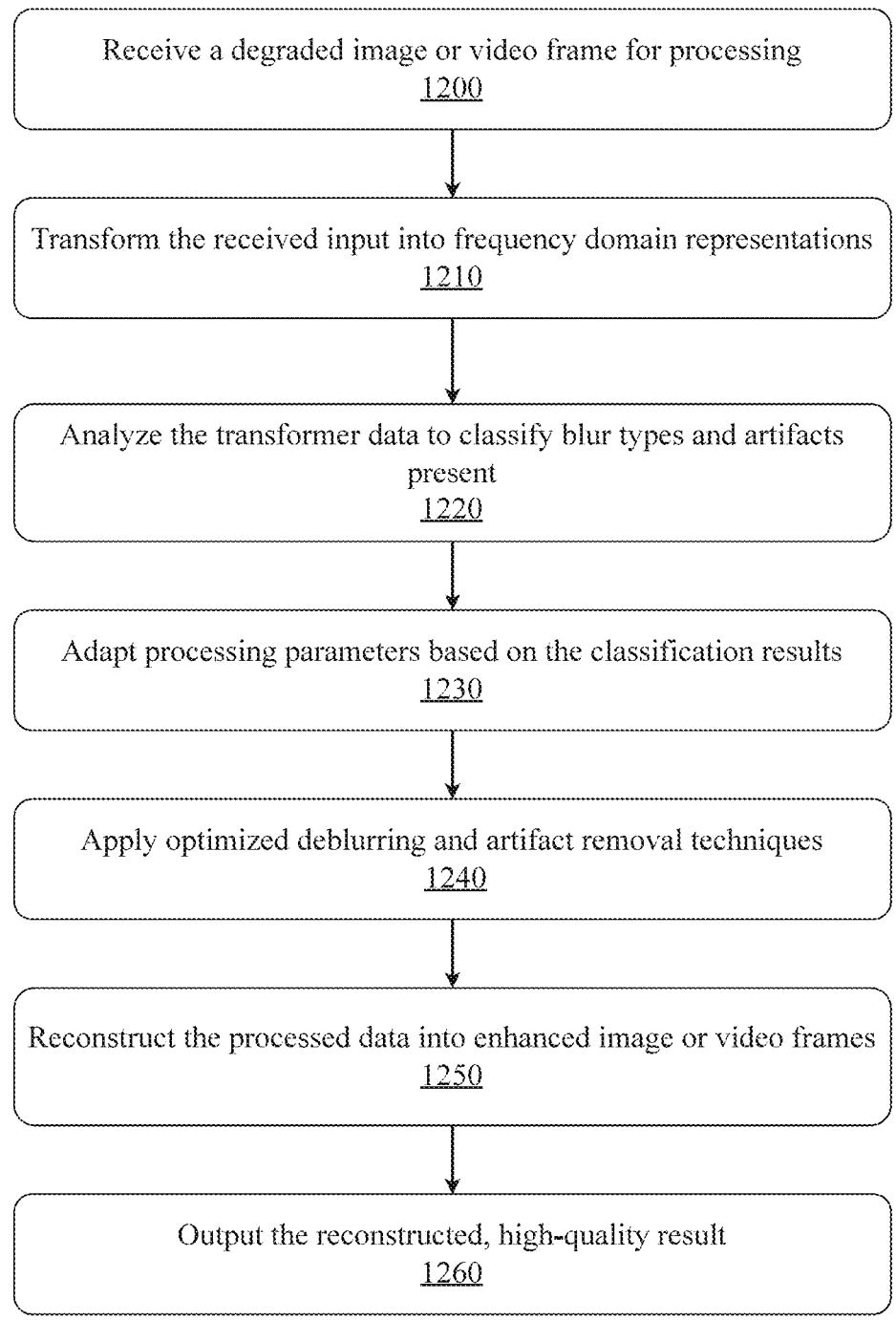
FIG. 12 is a flow diagram illustrating an exemplary method for adaptive real time discrete cosine transform image and video processing with convolutional neural network architecture, according to an embodiment.

FIG. 12 is a flow diagram illustrating an exemplary method for adaptive real time discrete cosine transform image and video processing with convolutional neural network architecture, according to an embodiment. In a first step 1200, a degraded image or video frame is received for processing. This step initiates the entire enhancement process by acquiring the raw input data. The degraded input could come from various sources such as a low-quality camera, compressed video stream, or an image affected by motion blur. This step provides the raw material that the subsequent steps will work to improve. The quality and characteristics of this input will significantly influence the processing required and the final output quality.

In a step 1210, the received input is transformed into frequency domain representations. This transformation, typically achieved through methods like the Discrete Cosine Transform (DCT), converts the spatial image data into a form that separates different frequency components. This step is vital because many types of image degradation, such as blur and compression artifacts, are more easily identified and addressed in the frequency domain. The transformation provides a different perspective on the image data, revealing patterns and characteristics that might not be apparent in the spatial domain.

In a step 1220, the transformed data is analyzed to classify blur types and artifacts present. This analytical step is where the system determines the specific types of degradation affecting the image or video frame. By examining the frequency domain representations, the system can identify characteristics indicative of different blur types (e.g., motion blur, defocus blur) and artifacts (e.g., compression blocking, ringing). This classification helps guide subsequent processing steps, allowing the system to tailor its approach to the specific degradations present in each input.

In a step 1230, processing parameters are adapted based on the classification results. This step represents the system's ability to dynamically adjust its processing strategy based on the analysis from the previous step. By fine-tuning parameters such as filter strengths, threshold values, or even selecting different processing algorithms, the system optimizes its approach for the specific degradations identified. This adaptive capability is key to achieving high-quality results across a wide range of input conditions.

In a step 1240, optimized deblurring and artifact removal techniques are applied. This is the core processing step where the actual image enhancement occurs. Using the adapted parameters from the previous step, the system applies specialized algorithms to counteract the identified blur and remove artifacts. This step might involve operations such as inverse filtering, regularized deconvolution for deblurring, or frequency domain manipulation for artifact removal. The optimization ensures that the processing is tailored to address the specific issues present in the current input.

In a step 1250, the processed data is reconstructed into enhanced image or video frames. This step involves converting the processed frequency domain data back into the spatial domain, resulting in a visually improved image or video frame. The reconstruction process ensures that the enhancements made in the frequency domain are correctly translated into visible improvements in the final output. This step helps produce a result that can be displayed or further processed in standard image or video formats.

In a step 1260, the reconstructed, high-quality result is output. This final step delivers the enhanced image or video frame for further use, whether it's for display, storage, or additional processing. The output represents the culmination of all previous steps, providing a significantly improved version of the original degraded input. This step allows for realizing the practical benefits of the entire process, whether it's improving visual quality for viewers, enhancing the accuracy of subsequent image analysis tasks, or preparing content for high-quality reproduction.

Figure 13:
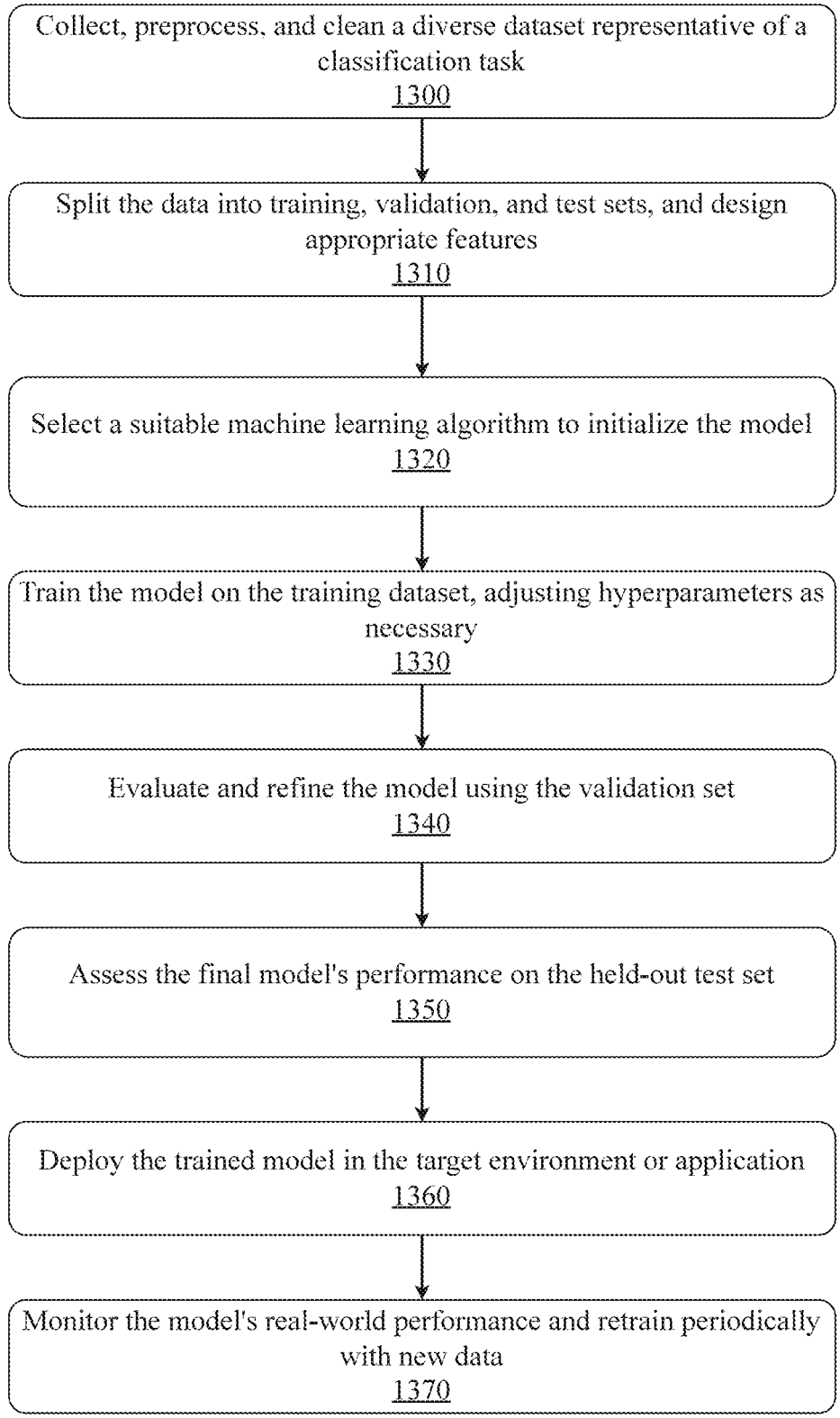
FIG. 13 is a flow diagram illustrating an exemplary method for training an adaptive blur and artifact classification module.

FIG. 13 is a flow diagram illustrating an exemplary method for training an adaptive blur and artifact classification module. In a first step 1300, a diverse dataset representative of the classification task is collected, preprocessed, and cleaned. This initial step forms the foundation of the entire machine learning process. Collection involves gathering a wide range of examples that cover all aspects of the classification problem. Preprocessing might include normalizing data, handling missing values, or encoding categorical variables. Cleaning involves removing or correcting erroneous data points. The quality and representativeness of this dataset significantly impact the model's ability to generalize and perform well on real-world data. A well-prepared dataset helps prevent issues like bias and overfitting in later stages.

In a step 1310, the data is split into training, validation, and test sets, and appropriate features are designed. This step ensures an unbiased evaluation of the model and for feature engineering. The training set, typically the largest portion, is used to teach the model. The validation set helps in tuning the model and preventing overfitting. The test set, kept completely separate, provides a final assessment of the model's performance. Feature design involves selecting or creating the most relevant attributes of the data for the classification task. This might include techniques like dimensionality reduction, feature scaling, or creating new features from existing ones. Proper data splitting and feature design lay the groundwork for effective model training and reliable performance estimation.

In a step 1320, a suitable machine learning algorithm is selected to initialize the model. This step involves choosing an algorithm that's appropriate for the specific classification task, considering factors like the nature of the data, the complexity of the problem, and computational resources. Options might include decision trees, support vector machines, neural networks, or ensemble methods like random forests. The choice of algorithm can significantly impact the model's performance, interpretability, and training time. Initializing the model sets the starting point for the training process.

In a step 1330, the model is trained on the training dataset, with hyperparameters adjusted as necessary. This is where the model learns to make predictions based on the input features. The training process involves exposing the model to the training data repeatedly, allowing it to adjust its internal parameters to minimize prediction errors. Hyperparameter adjustment, which might involve techniques like grid search or random search, helps optimize the model's learning process.

In a step 1340, the model is evaluated and refined using the validation set. This step serves as a checkpoint to assess how well the model generalizes to data it hasn't been trained on. The validation set helps detect overfitting, where the model performs well on training data but poorly on new data. Based on the validation results, the model can be refined by adjusting hyperparameters, modifying the model architecture, or even revisiting the feature design. This iterative process of evaluation and refinement is key to developing a robust and accurate classifier.

In a step 1350, the final model's performance is assessed on the held-out test set. This step provides an unbiased estimate of how well the model will perform on completely new, unseen data. The test set, which has been kept separate throughout the development process, simulates real-world application of the model. Performance metrics such as accuracy, precision, recall, and F1 score are typically used to quantify the model's effectiveness.

In a step 1360, the trained model is deployed in the target environment or application. This step transitions the model from development to practical use. Deployment might involve integrating the model into a larger software system, setting up necessary infrastructure for real-time predictions, or packaging the model for distribution. Considerations during deployment include scalability, latency, and compatibility with existing systems.

In a step 1370, the model's real-world performance is monitored, and it is retrained periodically with new data. This ongoing step ensures the model remains effective over time. Real-world data may differ from the training data or change over time (concept drift), affecting the model's performance. Monitoring helps detect these issues early. Periodic retraining with new data allows the model to adapt to changing patterns or new categories in the classification task. This step is essential for maintaining the model's relevance and accuracy in dynamic real-world environments.

Exemplary Computing Environment

Figure 14:
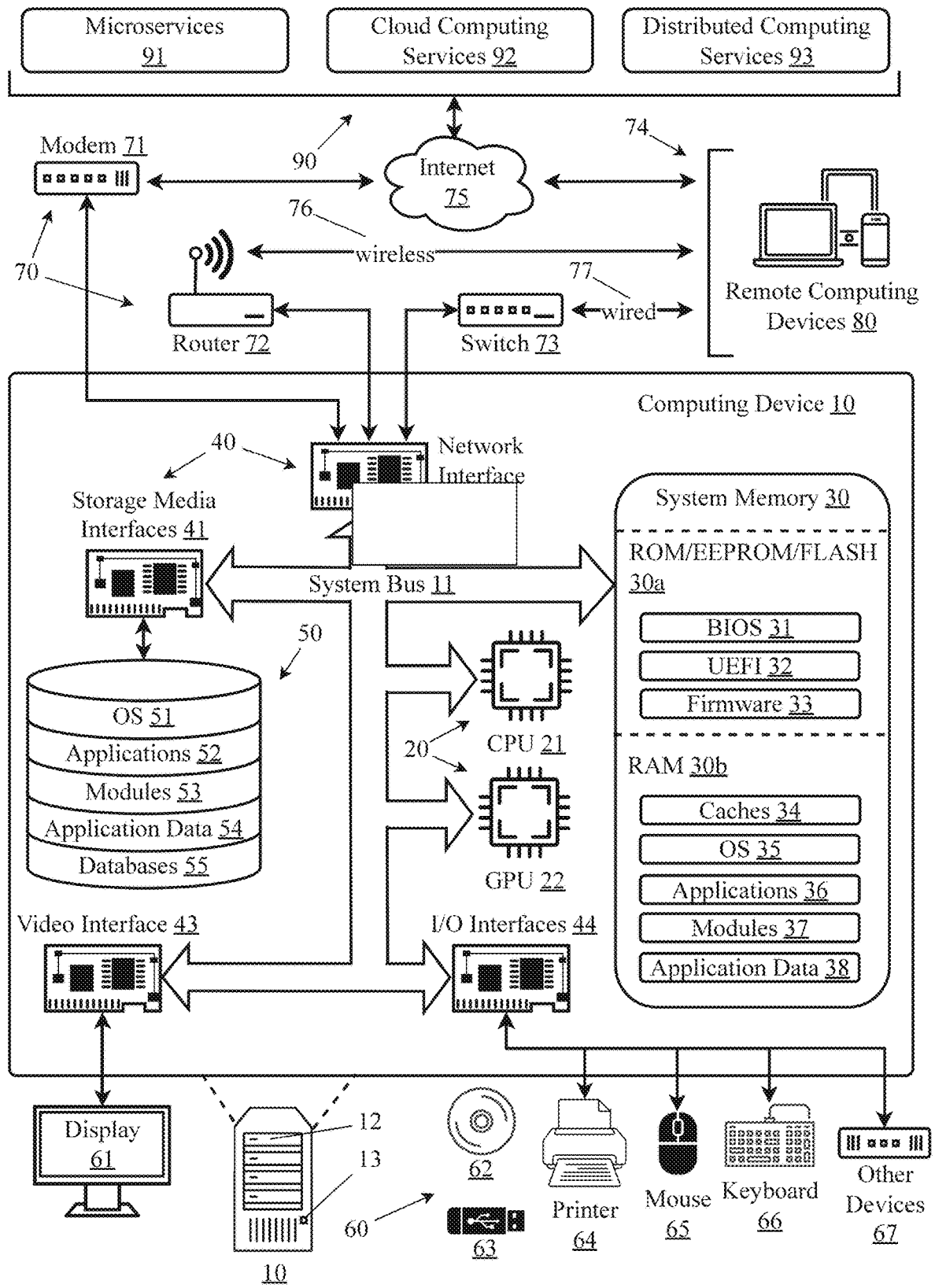
FIG. 14 illustrates an exemplary computing environment on which an embodiment described herein may be implemented, in full or in part.

FIG. 14 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for adaptive real time discrete cosine transform image and video processing with convolutional neural network architecture, comprising:
    a computing device comprising at least a memory and a processor;
    a Discrete Cosine Transform (DCT) Block configured to receive an initial input and output a plurality subband images;
    a plurality of DCT Deblur Network channels comprising a DCT Deblur Network DC channel and a DCT Deblur Network AC channels, wherein each channel is configured to process a specific frequency component;
    a parallel processing unit configured to simultaneously process all DCT Deblur Network channels; and
    a plurality of programming instructions stored in the memory and operable on the processor, wherein the first plurality of programming instructions, when operating on the processor, cause the computing device to:
        send a degraded input through the DCT Block where the degraded image is transformed into a plurality of transformed images; and
        simultaneously process the plurality of transformed images with all DCT Deblur Network channels using the parallel processing unit.

2. The system of claim 1, wherein the DCT Deblur Network channels further comprise a convolutional neural network.

3. The system of claim 2, wherein the DCT Block transforms the degraded image through a 4×4 Discrete Cosine Transform function.

4. The system of claim 2, wherein the DCT Block transforms the degraded image through a wavelet transform function.

5. The system of claim 2, wherein the DCT Block creates a plurality of subband images which may either be high energy (AC) or low energy (DC).

6. The system of claim 2, further comprising a loss function to compute the transform domain loss for each channel in the DCT Deblur Network channels.

7. The system of claim 2, further comprising an adaptive blur and artifact classification module that processes the plurality of subband images into a plurality of identified degradations.

8. The system of claim 7, wherein the adaptive blur and artifact classification module adjusts the DCT Deblur Network channels to be optimized for the plurality of identified degradations.

9. The system of claim 7, wherein the adaptive blur and artifact classification module is trained using a database of identified degradations, including but not limited to blurs and artifacts.

10. A method for real time discrete cosine transform image and video processing with convolutional neural network architecture, comprising the steps of:
    sending a degraded input through a DCT Block where the degraded image is transformed into a plurality of transformed images; and
    simultaneously processing the plurality of transformed images using a plurality of DCT Deblur Network channels using a parallel processing unit, wherein the plurality of DCT Deblur Network channels comprise a DCT Deblur Network DC channel and a DCT Deblur Network AC channels, and wherein each channel is configured to process a specific frequency component.

11. The method of claim 10, wherein the DCT Deblur Network channels further comprise a convolutional neural network.

12. The method of claim 11, wherein the DCT Block transforms the degraded image through a 4×4 Discrete Cosine Transform function.

13. The method of claim 11, wherein the DCT Block transforms the degraded images through a wavelet transform function.

14. The method of claim 11, wherein the 4×4 Discrete Cosine Transform function creates a plurality of subband images which may either be high energy (AC) or low energy (DC).

15. The method of claim 11, further comprising a loss function to compute the transform domain loss for each channel in the DCT Deblur Network channels.

16. The method of claim 11, further comprising an adaptive blur and artifact classification module that processes the plurality of subband images into a plurality of identified degradations.

17. The method of claim 16, wherein the adaptive blur and artifact classification module adjusts the DCT Deblur Network channels to be optimized for the plurality of identified degradations.

18. The method of claim 16, wherein the adaptive blur and artifact classification module is trained using a database of identified degradations, including but not limited to blurs and artifacts.

\* \* \* \* \*